Feb. 2, 1932.    L. H. CHURCH    1,843,204
CAPPED BUSHING
Filed May 10, 1928

INVENTOR
Lewis H. Church
BY
Bobleber + Ledbetter
ATTORNEYS

Patented Feb. 2, 1932

1,843,204

UNITED STATES PATENT OFFICE

LEWIS H. CHURCH, OF ROSELLE, NEW JERSEY, ASSIGNOR TO THE THOMAS & BETTS CO., OF ELIZABETH, NEW JERSEY, A CORPORATION OF NEW JERSEY

CAPPED BUSHING

Application filed May 10, 1928. Serial No. 276,630.

This invention relates to capped bushings for closing pipes or conduits to keep their interior clean and free from dirt or moisture.

Primarily, an object is to produce a closed or capped bushing for pipes, the closure or cap of which can be readily pried off and removed from the bushing so that one may gain access to the pipe on which the bushing is fastened but at the same time leave the bushing in place on the pipe end if that be desired.

In general conduit work carried out in connection with electrical house wiring and other conduit work where the end of the pipe or conduit is bushed to form a smooth surface, it is advisable and more frequently is required that the pipe be kept clean on the inside thereof and for this purpose should be sealed at their ends. For example where the conduit is pulled through the walls of a building, or where pipe is thrown on the floor of a building under construction, the pipes become dirty and clogged inside with plaster or other substances or water may flow in where the pipe is left in the open. This is a detriment in completing electrical house wiring or other work involving the use of conduit. The same is true of gas and water pipe installations and they should be maintained clean and dry on the inside.

The workmen on the job at the present time have no satisfactory way to close the pipe ends other than by stuffing the ends or by driving in a wooden plug. This may result in battering the pipe end or getting splinters in the pipe. Furthermore the stuffing or plug may fall or pull out because the pipe is dragged on its plugged end and the plug catches on some obstruction. Present means for maintaining the inside of pipes clean are generally unsatisfactory and archaic.

The invention therefore seeks to provide a new and useful pipe closing means and it is an object to secure this closing means to the bushing which ordinarily is not removed from the pipe but which bushing is left intact after the pipe is actually installed in place and ready to receive electric wires. Therefore by closing the bushing with a cap which is removable, the workman on the job maintains the pipe in a clean and dry condition and when ready to open the pipe, he simply removes the cap and leaves the bushing in place on the pipe end.

To this end the invention seeks to provide a thin sheet metal closure or cap expanded and anchored in the mouth of a bushing and which is made of thin metal and can be lifted out by simply jabbing a screw driver or other sharp hand tool into the cap and removing it and throwing it aside to open the pipe only when actually ready to gain access thereto.

The accompanying drawings show the construction of the capped bushing and the process of making it and serve as an example to show the principles of invention.

Figure 3 is a side view of an expanding die tool used to anchor the pan-shaped cap in a bushing; and Figure 4 is a bottom plan view thereof.

Figure 5 is a cross-sectional view of the expanding die tool in loose position before the cap is anchored in the bushing; and Figure 6 is a similar view but the tool is in expanded position and has anchored the cap in the bushing.

Figure 1:
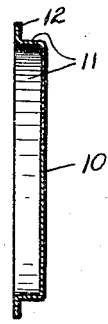
Figures 1 and 2 illustrate, respectively, a cross-section and a top inside view of a pan-shaped cap made of thin sheet metal and which is readily expanded and anchored in the smooth oval-edged mouth of a bushing.
Figure 2:
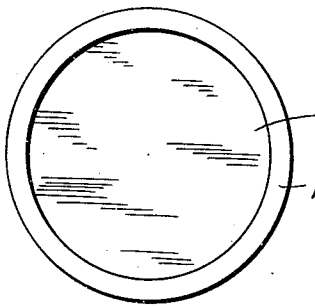

In the process of manufacturing this capped bushing, one course of procedure is to place the thin sheet metal cap within the mouth of the bushing or any similarly constructed ring member, whereupon the cap is expanded by stretching its closure wall and enlarging the cap to make it overlap the edge of the bushing on one side of the mouth and at the same time a flange on the cap overlaps the oval edge on the other side of the mouth. This process fastens the cap in the bushing. Any suitable form of expanding die or tool is used for anchoring the cap in the bushing.

One form of sheet metal cap suitable for this work consists of a pan-shaped cap which includes a bottom wall 10 formed on a rim 11 including a flange 12. This cap 10 is made of comparatively thin ductile or soft sheet metal so that the cap easily expands and anchors itself to the bushing and at the same time the wall 10 is easily punctured by the workman's screw driver or other tool to remove the cap from the bushing when its purpose has been served.

One form of bushing which is universally used consists of a ring-like member 14 which includes any suitable means for anchoring it to a pipe P. Bushings are ordinarily screw threaded for that purpose. Of more importance is the fact that bushings of the kind in question usually have an oval inwardly directed edge, bead or mouth defining rim. This edge or bead 15 is ovaled or rounded in cross-section to afford a smooth surface over and through which wires may be dragged in the course of threading them through conduits. I have devised a special type of closure cap which anchors itself to this ovaled bushing mouth 15 and which securely fits in place but which is easily torn therefrom.

One suitable automatic tool for fastening the caps within the bushing is illustrated and its mode of action will be explained. A cylindrical die 17 has an expanding flange 18 formed on one end. This flange is defined by a straight surface 19 perpendicular to the axis of the expanding die and it has its other surface 20 formed at an angle to the axis. The two surfaces 19 and 20 intersect thus affording a rather sharply drawn circular expanding flange, the circular edge 21 of which fits closely into the circular corner of the cap 10 where the rim 11 and wall 10 join.

Figure 3:
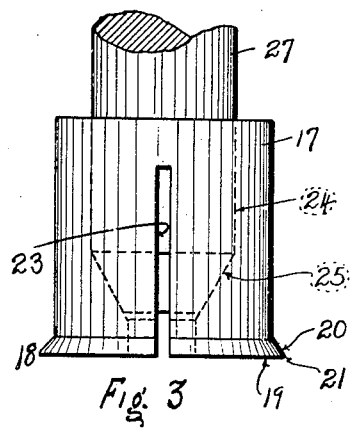
Figures 3 through 6 are presented to illustrate the manner of manufacturing the capped bushing.
Figure 4:
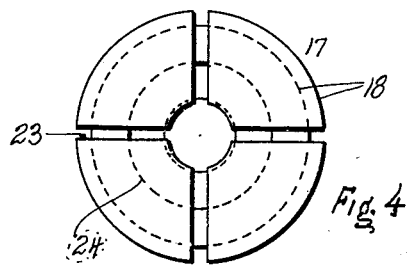

The die member 17 is provided with longitudinal slits 23 which cut through that end of the cylindrical member carrying the expanding flange 18 and the slits extend toward the other end but do not cut therethrough. In this way the lower end die flange 18 is made expansible and contractible while the other end of the member 17 is solid and imparts resiliency to the slitted portions thereby forming a die member which normally returns to the position shown in Figures 3, 4 and 5 when relieved of the expanding strain.

The expanding die member 17 is provided with a plunger receiving socket consisting of an upper bore or cylindrical socket portion 24 and lower conic portion 25. The conic socket portion is adjacent the expanding flange 18. It is through the agency of the socket 24—25, together with a reciprocating die-spreading plunger, that the tool is expanded to the position shown in Figure 6 to anchor the pan-shaped cap in the bushing.

A plunger for use in connection with the expanding tool 17 comprises a cylindrical member 27 having a conic shaped lower extremity 28 which impinges the similarly shaped socket 25 to spread the die at its split and flanged end 18. The plunger 27 is freely retained in the socket bore of the tool 17 and is reciprocated by any suitable press mechanism which is not a part of the invention and not shown.

It is required that a foundation or support be provided on which to mount and hold the bushing 14 and closure cap 10. To this end a rigid support of any character is provided and may be referred to as an anvil 30 including an upstanding reduced cylindrical head portion 31 which holds the bushing in place and acts as a flat smooth support against which the wall 10 of the closure is rested and also acts as a stop against which the expanding tool comes to rest when lowered onto the work.

Figure 5:
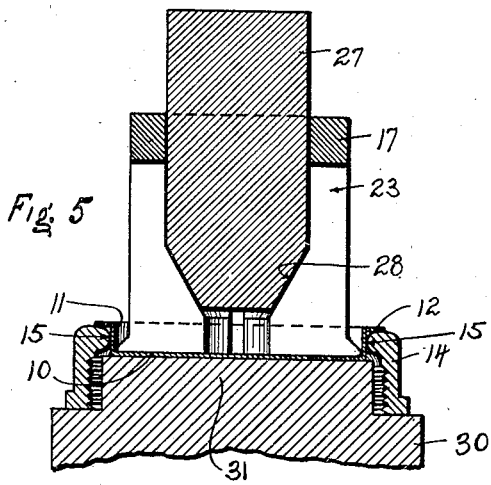
Figure 6:
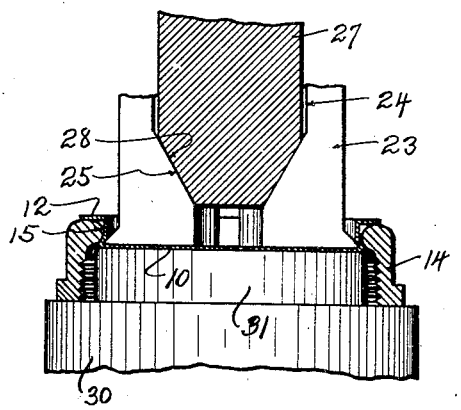

As observed in Figures 5 and 6 showing the process of manufacturing capped bushings, a bushing 14 is set in place over the anvil head 31 whereupon a closure cap 10 is placed within the mouth formed by the edge 15 of the bushing with the cap flange 12 resting on one side of the mouth, i. e., on the outer end of the bushing. The wall 10 rests on the upper flat plane surface of the anvil head 31. This relation of parts disposes the wall 10 in line with the underneath or inside ovaled edge of the bushing edge 15 and the cap rim 11 fits into the mouth formed by the bead 15. The inside diameter of the rim 11 of the closure and the outside diameter of the expanding flange 18 are similar so the die end 18 is received down into the cap and stops against the wall 10 and hence the tool 17 is supported on the anvil. This places the point or circular edge 21 of the tool in the bottom circular corner of the cap.

Figure 7:
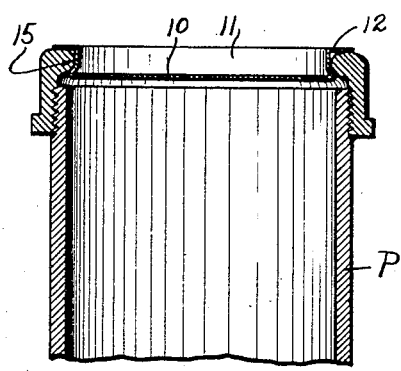
Figure 7 is a longitudinal section of a pipe end with a capped bushing screwed thereon, and the cap is easily removed from the bushing without unscrewing the bushing, but it cannot be dragged off in transit and ordinary handling operations.

The plunger 27 is now driven downwardly into the stationary tool 17 and the cooperating conic surfaces 25 and 28 cause the split die end 18 to expand against the rim 11 proximate the plane of the wall 10. The result is that the rim 11 is expanded around and along a circular line at the point of jointure of the rim 11 and wall 10 forming a retaining or anchoring lip. This expansion at and along the particular point and line stated is in the plane of the wall 10 and is carried out by reason of the fact that the wall 10 of the cap is ductile and stretches sufficiently to permit the rim 11 to be enlarged in diameter forming the anchoring lip so as to anchor the cap under and on the inside of the ovaled mouth edge 15. The plunger 27 is now withdrawn and the bushing is closed by the cap as shown in Figure 7.

It is observed that the cap flange 12 rests on the exterior side of the bushing edge 15 while the expanded rim portion in the plane of the cap wall 10 is enlarged, overlaps and seats against the other side of the bushing edge 15. In other words, the ovaled bushing edge 15 is confined between the flange 12 and circular expanded corner of the soft metal cap which securely holds the cap within the bushing.

The bushing disclosed and the method of producing it provides an inexpensive means of closing pipe ends and the workmen or contractors on the job screw the bushing on the threaded pipe ends. When the pipes are ready for use, especially when the bushing is to be left on the pipe end, the workman simply jabs a sharp tool through the thin center of the cap and prys it off. The pipe is left clean and the operation is a simple one because the pipe is opened up without removing the bushing. The cap is so securely fastened in the bushing that it cannot accidentally be dislodged.

What is claimed is:

1. A capped bushing comprising a threaded ring including an edge defining a mouth forming a bushed passage, and a closure secured in the mouth and consisting of a sheet metal member including a flange greater in diameter than the diameter of the bushing mouth resting against the oval edge exterior of the mouth and a portion expanded to definitely grip the edge on the inner side of the mouth to form a bead on the closure of a substantially larger diameter than the mouth to render the member removable only by mutilation thereof.

2. A closure for pipe ends comprising a screw threaded ring adapted to engage a pipe end, an inwardly directed bead of reduced diameter formed in the ring; a thin sheet metal pan-shaped closure having a flange greater in diameter than the diameter of the bushing mouth and seated against the exterior of the ring, a rim seated against the inner diameter of the head, and a lip expanded upon the inner edge of the rim and of a substantially larger diameter to anchor the closure to the ring so that the closure can only be removed by a tool which punctures and tears it away but leaves the ring on the pipe.

In testimony whereof I affix my signature.

LEWIS H. CHURCH.